(12) United States Patent
Onda

(10) Patent No.: US 7,125,177 B2
(45) Date of Patent: Oct. 24, 2006

(54) LENS PROTECTION MECHANISM AND CAMERA WITH LENS PROTECTION MECHANISM

(75) Inventor: Kazuhiko Onda, Saitama (JP)

(73) Assignee: Fujinon Corporation, Saitama (JP)

( * ) Notice: Subject to any disclaimer, the term of this patent is extended or adjusted under 35 U.S.C. 154(b) by 168 days.

(21) Appl. No.: 10/902,094

(22) Filed: Jul. 30, 2004

(65) Prior Publication Data

US 2005/0025476 A1  Feb. 3, 2005

(30) Foreign Application Priority Data

Jul. 30, 2003  (JP) .............................. 2003-282969

(51) Int. Cl.
*G02B 17/00* (2006.01)
(52) U.S. Cl. ..................................... 396/448
(58) Field of Classification Search ................. 396/448
See application file for complete search history.

(56) References Cited

U.S. PATENT DOCUMENTS 5,602,607 A * 2/1997 Kato et al. ................... 396/349
5,617,167 A * 4/1997 Kaji ............................ 396/448
6,419,407 B1 * 7/2002 Nakazawa ................... 396/448

FOREIGN PATENT DOCUMENTS

| JP | 1-248144 | 10/1989 |
|---|---|---|
| JP | 2612128 | 2/1997 |

\* cited by examiner

*Primary Examiner*—W. B. Perkey
(74) *Attorney, Agent, or Firm*—Young & Thompson

(57) ABSTRACT

A simple and compact lens protection mechanism for protecting an optical lens system in a lens barrel comprises a lens barrier member rotatable in a plane perpendicular to an optical axis between an open position for uncovering the optical lens system and a closed position for covering the optical lens system, a neutralizing spring incorporated with the lens barrier member, and a barrier drive ring operationally coupled to the lens barrier member by the neutralizing spring. The barrier drive ring is rotatable in opposite directions so as to drive the lens barrier member through the neutralizing spring between the open position and the closed position.

7 Claims, 9 Drawing Sheets

LENS PROTECTION MECHANISM AND CAMERA WITH LENS PROTECTION MECHANISM

BACKGROUND OF THE INVENTION

1. Field of the Invention

The present invention relates to a lens protection mechanism for protecting an optical lens system and a camera equipped with the lens protection mechanism.

2. Description of Related Art

Portable compact cameras such as a conventional compact still camera for use with a silver film and a digital camera are generally equipped with lens protection mechanisms installed at a front end of a lens barrel for the purpose of protecting an objective lens from getting dirt and damage while the camera is unused.

One of such lens protection mechanisms disclosed in, for example, Japanese Patent Publication No. 2612128 comprises a protection cover, bias means such as a biasing spring for biasing the protection cover toward an uncovering or open position, cover closing means for forcing the protection cover to a covering or closed position and activation means for activating the bias means and the cover closing means in cooperation with each other. The activation means is operationally disconnected from the cover closing means to allow the protection cover to be forced to the open position by the bias means when a collapsible lens barrel is extended and, on the other hand, is operationally linked with the cover closing means to force the protection cover to the closed position against the bias means when the collapsible lens barrel is retracted.

Another lens protection mechanism disclosed in, for example, Japanese Unexamined Patent Publication No. 1-248144 comprises a lens barrier member and an operating ring member. While the camera is put to nonuse, the lens protection mechanism brings the operating ring member into engagement with a latch member forming part of the camera body and simultaneously maintains the lens barrier member in a covering or closed position by means of a link spring operationally linking the lens barrier member with the operating ring member together. On the other hand, when the camera is put to use, the operating ring member is released from the latch member to allow a tension spring linking the operating ring member with the camera body to force the operating ring member to rotate so as thereby to bring the lens barrier member into an uncovered or open position Recent marked development of cameras presses a demand for a more compact configuration and, in consequence, a strong demand for a downsized lens protection mechanism installed in the compact camera as well as a demand for reductions in manufacturing cost. Since the prior art lens protection mechanisms exemplified above are accompanied by a mechanisms adapted to always force the lens cover member toward the closed position against the bias spring operative to bias the lens cover member toward the open position, it is essential for the lens protection mechanism to include a bias spring or a bias structure for forcing the lens cover member with bias force sufficiently stronger than the bias spring. This is one of undesirable factors standing in the way of making the lens protection mechanism compact and reducing the manufacturing cost of the lens protection mechanism.

SUMMARY OF THE INVENTION

It is therefore an object of the present invention to provide a lens protection mechanism that is structurally simple and compact and, at the same time, is reliably maintained in both open and closed positions with lower driving force and a camera equipped with the lens protection mechanism.

The foregoing object of the present invention is accomplished by a lens protection mechanism for protecting an optical lens system in an optical lens barrel and a camera equipped with the lens protection mechanism. The lens protection mechanism comprises a lens barrier member disposed in front of the optical lens system in the optical lens barrel so as to be capable of rotating in a plane perpendicular to an optical axis of the optical lens system between an open position in which the lens barrier member uncovers the optical lens system and a closed position in which the lens barrier member covers the optical lens system for protection, a neutralizing spring incorporated with the lens barrier member, and a barrier drive ring operationally coupled to the lens barrier member by the neutralizing spring. The barrier drive ring is rotatable in opposite directions about the optical axis of the optical lens system so as to drive the lens barrier member through the neutralizing spring between the open position and the closed position.

According to the lens protection mechanism and the camera equipped with the lens protection mechanism, opening and closing operation of the lens barrier member is performed through the neutralizing spring with comparatively weak drive force. Furthermore, in the event where accidental external force is applied to the lens protection member, in the closed position or in the open position, the neutralized spring absorbs the external force.

The optical lens barrel in which the lens protection mechanism is built in may be of a collapsible type being extending and retracting along the optical axis of the optical lens system between an extended position and a retracted position. In this instance, the barrier drive ring is rotated in opposite directions resulting from axial movement of the optical lens barrel between the extended position and the retracted position. The collapsible optical lens barrel may comprise a movable cylinder movable along the optical axis of the optical lens system, a guide member for guiding axial movement of the movable cylinder between the extended position and the retracted position, and a cam mechanism for operationally coupling the barrier drive ring to the guide member. The movable cylinder holds at least one lens component of the optical lens system and supports the barrier drive ring and the lens barrier member for rotation. The barrier drive ring is caused to rotate about the optical axis resulting from axial movement of the movable cylinder relative to the guide member.

It is preferred for the lens protection mechanism built in the collapsible optical lens barrel that the barrier drive ring has a projection extending from the ring, the lens barrier member has a projection corresponding in circumferential position to the radial projection, and the neutralizing spring comprises a coil spring having opposite end extensions which straddles the projections of the lens barrier member and the barrier drive ring therebetween so as to keep the lens barrier member in neutralized position with respect to the barrier drive ring between the open position and the closed position It is further preferred for the lens protection mechanism built in the collapsible optical lens barrel that the neutralizing spring allows the lens barrier member to rotate toward the open position while the barrier drive ring stays in the closed position and to rotate toward the closed position while the barrier drive ring stays in the open position. In this instance, the open position is defined by a maximum limit position to which the lens barrier member is mechanically allowed to rotate, in other words, in which the lens barrier member provides a maximum opening. Similarly, the open position is defined by a minimum limit position to which the lens barrier members are mechanically allowed to rotate in reverse, in other words, in which the lens barrier members provide a minimum opening (substantially complete closure).

It is preferred that the lens barrier member is divided into a pair of parts disposed symmetrically about the optical axis of the optical lens system.

The lens protection mechanism having the above configuration enables opening and closing the lens barrier member with a tiny external load applied to the neutralizing spring, so that the lens protection mechanism is downsized and is manufactured at a lower cost. In addition, in the event where lens barrier member is unintentionally applied with external an accidental external load, the external load is absorbed by the neutralizing spring with the consequence that the lens barrier amber and/or the barrier drive ring are prevented from being damage. In particular, while the barrier drive ring is in the open position, the neutralizing spring forces the lens barrier member keeps staying certainly in the open position. Similarly, while the barrier drive ring is in the closed position, the neutralizing spring forces the lens barrier member keeps staying certainly in the closed position.

BRIEF DESCRIPTION OF THE DRAWINGS

The above other object and features of the present invention will be clearly understood from the following detailed description when read with reference to the accompanying drawings, wherein the same numeral numbers have been used to denote same or similar parts or mechanisms throughout the drawings and in which.

DETAILED DESCRIPTION OF THE PREFERRED EMBODIMENTS

In the following description, the term "front" as used herein shall mean and refer to the object side of the optical lens system (the left side of drawing), and the term "rear" as used herein shall mean and refer to the image side of the optical lens system (the right side of drawing).

Figure 1:
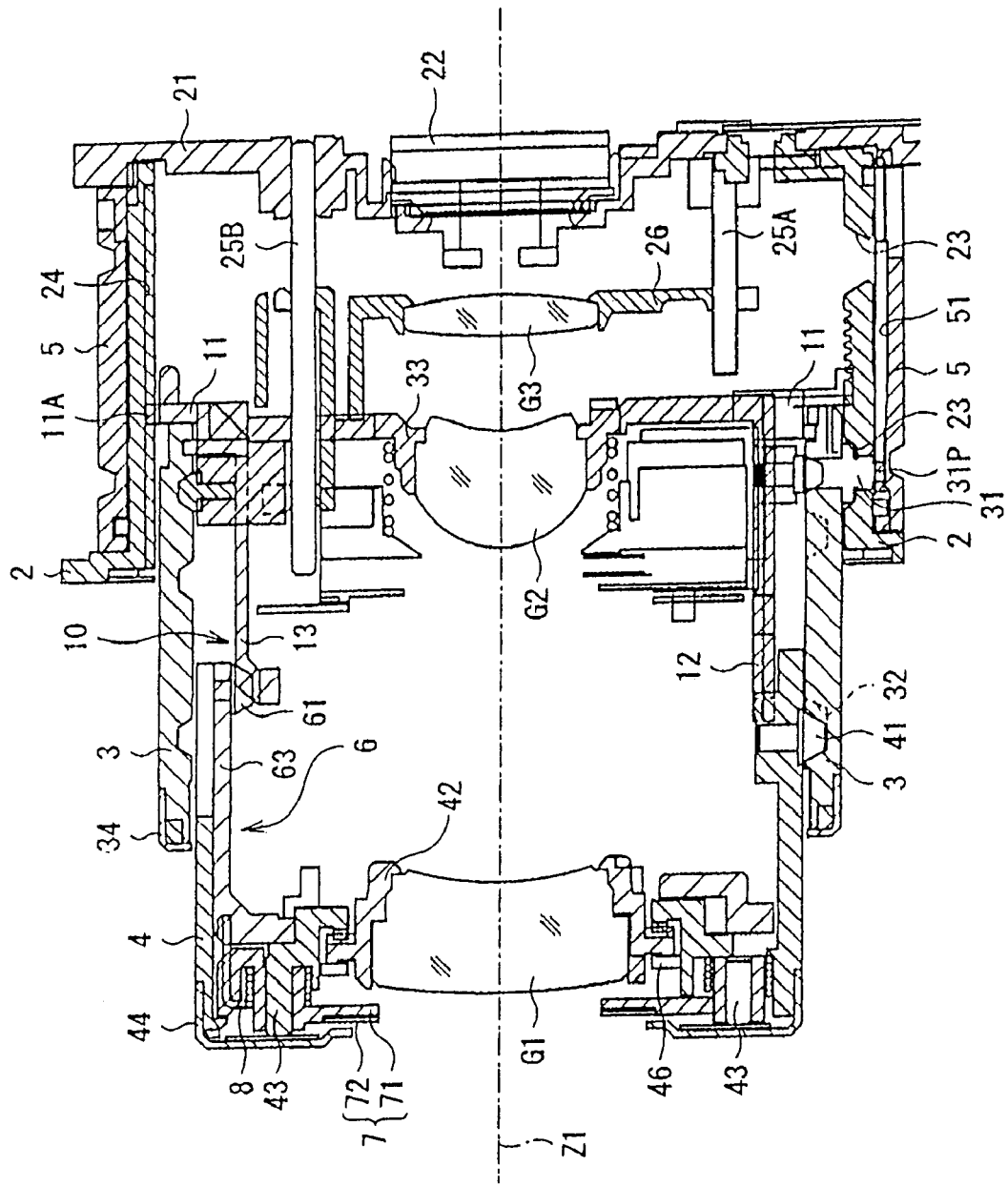
FIG. 1 is a longitudinal sectional view of a collapsible lens barrel equipped with a lens protection mechanism according to a preferred embodiment of the present invention in which the collapsible lens barrel is in its extended position.
Figure 2:
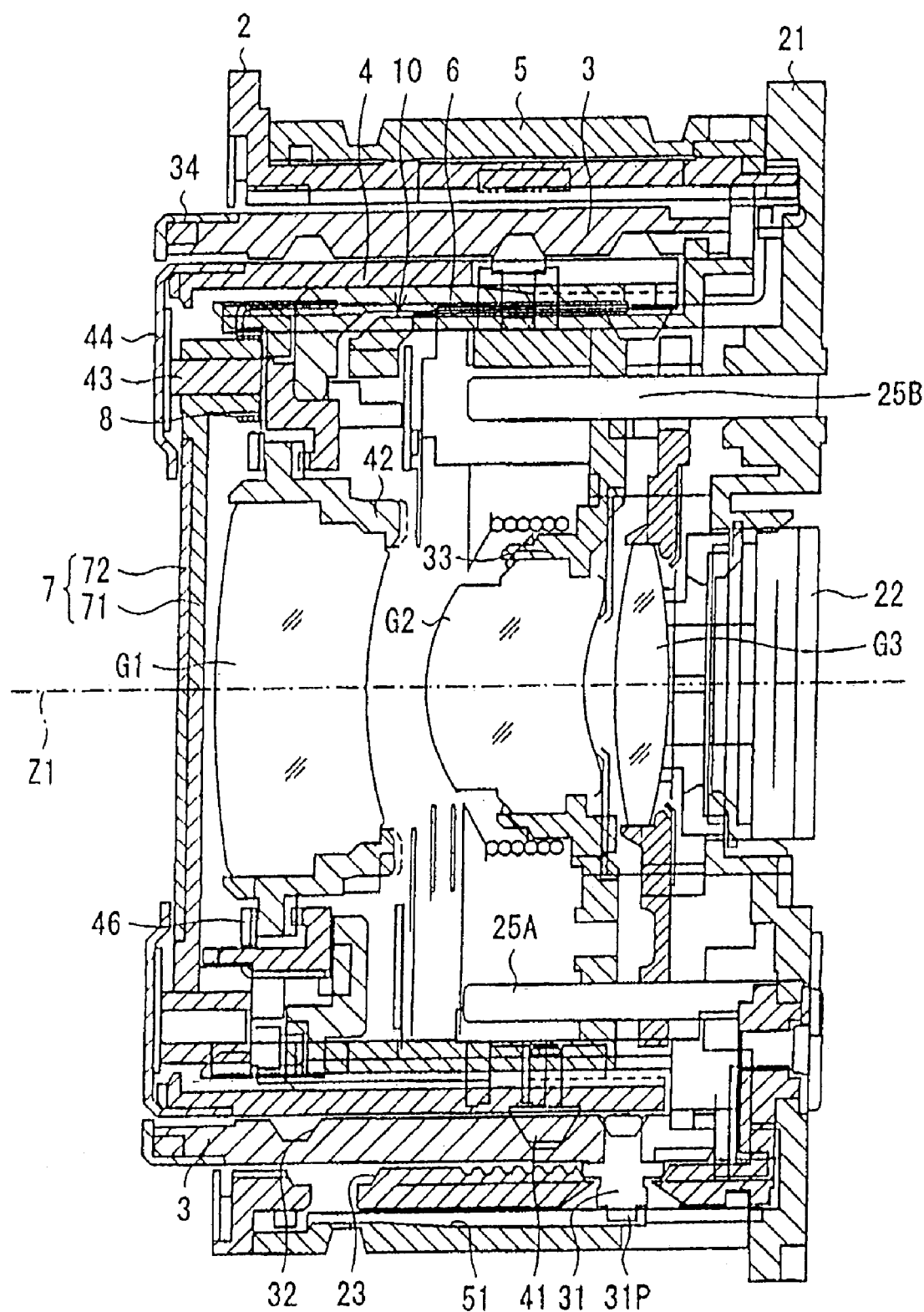
FIG. 2 is a longitudinal sectional view of the collapsible lens barrel in which the collapsible lens barrel is in its retracted position.
Figure 3:
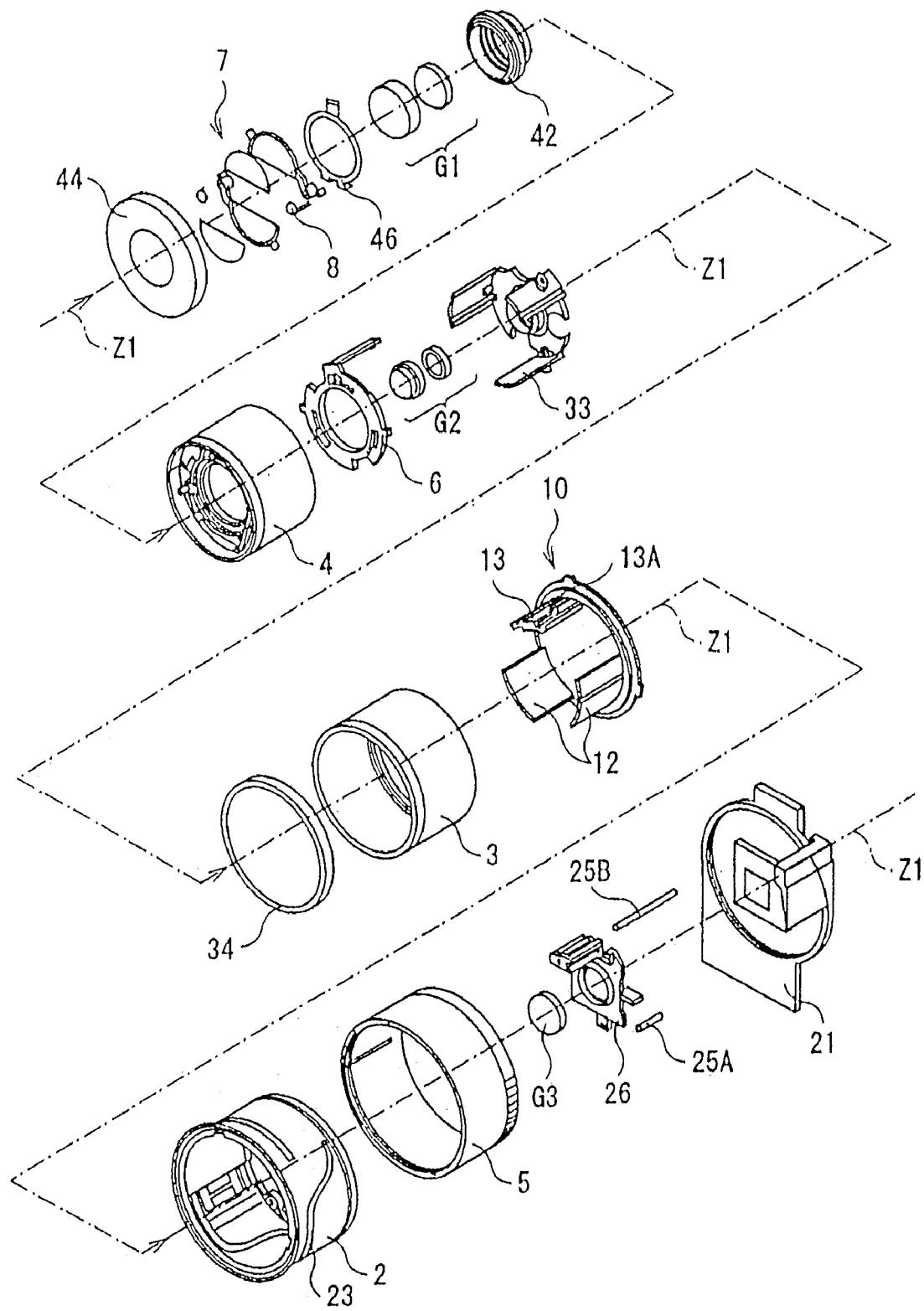
FIG. 3 is an exploded perspective view of an internal structure of the collapsible lens barrel.

Referring to the drawings in detail, and, in particular, to FIGS. 1 to 3 showing a motor-driven collapsible lens barrel, which is hereafter referred to a lens barrel for simplicity, according to an embodiment of the present invention, the lens barrel is capable of shifting its position between an extended position shown in FIG. 1 and a retracted position shown in FIG. 2. The lens barrel includes an optical lens system and a lens protection mechanism. The optical lens system comprises, in order from the object side to the image side, a first lens group G1 fixedly mounted in a first lens holding frame 42, a second or zooming lens group G2 fixedly mounted in a second lens holding frame 33 and a third or focusing lens group G3 fixedly mounted in a third lens holding frame 33 which are movable in along an optical axis Z1 of the optical lens system following axial movement of the lens barrel along the optical axis Z1. The lens protection mechanism includes a lens barrier device 7 built in the lens barrel and positioned in front of the optical lens system. The lens barrier device 7 is capable of changing between an open position where it opens or uncovers the optical lens system, specifically the first lens group G1, as shown in FIG. 1 and a closed position where it covers the optical lens system, specifically the first lens group G1, for protection as shown in FIG. 2 following axial movement of the lens barrel between the extended position and the retracted position.

More specifically, the lens barrel comprises a stationary outer cylinder 2 fixedly mounted to a camera body (not shown), an intermediate cylinder 3 rotatable about and movable back and forth along the optical axis Z1 relative to the stationary outer cylinder 2, and an inner cylinder 4 movable back and forth along the optical axis Z1 relative to both stationary and intermediate cylinders 2 and 3. The lens barrel is mounted to the camera body by fixedly attaching the stationary outer cylinder 2 to a mounting ring 21 forming a part of the camera body. The mounting ring 21 is provided with a pair of guide shafts 25A and 25B diametrically separated from each other and extending forward therefrom and is equipped with an electronic image pick-up device such as a charge coupled device (CCD) 22 forming a part of the camera that is disposed in alignment with the optical axis Z1. The CCD 22 converts an optical image formed thereon by the optical lens system into electric signals as is well known in the art. The stationary cylinder 2 has a cam slot 23 formed in its wall so as to run helically through the wall and an axial guide groove 24 formed in an inner peripheral surface thereof.

The intermediate cylinder 3 is provided with a radial cam follower 31 that radially extends from the outer peripheral surface thereof and is received for slide movement in the cam slot 23 of the stationary outer cylinder 2 and is further provided with a helical cam groove 32 formed in the inner peripheral surface thereof. With this configuration, the intermediate cylinder 3 is held steadily in the stationary outer cylinder 2 and can move rearward and forth along the optical axis Z1 within the stationary outer cylinder 2 when it rotates relatively to the stationary outer cylinder 2. The cam follower 31 at its top is provided with a guide pin 31P.

The lens barrel further comprises a operating cylinder 5 mounted on the stationary outer cylinder 2 so as to t rotate on the stationary outer cylinder 2 about the optical axis Z1 but to be prevented from moving along the optical axis Z1, a barrier drive ring 6 of the lens barrier device 7 fitted for slide movement in the inner cylinder 4 and a ring-shaped key device 10. The lens operating cylinder 5 has an axial guide groove 51 formed in an inner peripheral surface thereof. The guide pin 31P of the cam follower 31 is received for slide movement in the axial guide groove 51. The lens drive cylindrical 5 is driven to rotate, manually or by means of a power drive device such as a motor (not shown). When the lens operating cylinder 5 rotates in one direction about the optical axis Z1, the intermediate cylinder 3 is forced to rotate in the same direction through sliding engagement between the guide pin 31P and the axial guide groove 51 and simultaneously to move along the optical axis Z1 forward or rearward through sliding engagement between the cam follower 31 of the intermediate cylinder 3 and the cam slot 23 of the stationary outer cylinder 2.

The ring-shaped key device 10 comprises a key ring 11, a radial projection 11A extending radially outward from the key ring 11 and three axial flaps 12 and 13 extending axially forward from the key ring land spaced at regular circumferential distances. The axial flap 13 of the ring-shaped key device 10 has a cam groove 13A formed in an outer peripheral surface thereof. The key ring 11 is rotatably mounted in the intermediate cylinder 3. The radial projection 11A slidably engages with the axial guide groove 24 of the stationary outer cylinder 2 so as to prevent the ring-shaped key device 10 from rotating. The ring-shaped key device 10 including the key ring 11 provided with the axial flaps 12 and 13 and the radial projection 11A functions to prevent the inner cylinder 4 from rotating and to causes indirectly the lens barrier device 7 to open and close as will be described in detail later. The key ring 11 is in engagement with a rear end of the intermediate cylinder 3 so as thereby to allow the intermediate cylinder 3 to rotate relatively to the key ring 11. The axial flaps 12 at their front ends are in engagement with a rear end of the inner cylinder 4 so as thereby to prevent the inner cylinder 4 to rotate.

The inner cylinder 4 is provided with a radial cam follower 41 extending radially from an outer peripheral surface of a rear end portion thereof so as to be received for sliding movement in the helical cam groove 32 formed in the inner peripheral surface of the intermediate cylinder 3. The inner cylinder 4 movably holds the first lens holding frame 42 fixedly mounting the first lens group G1 with an annular retaining spring 46 and is forced to move along the optical axis Z1 between the retracted position and the extended position through the engagement between the helical cam groove 32 and the radial cam follower 41 following rotation of the intermediate cylinder 3 so as thereby to shift the first lens group G1. Further, the inner cylinder 4 holds the barrier drive ring 6 so that the barrier drive ring 6 rotates about the optical axis Z1 and is provided with axial pivot shafts 43 (see FIG. 4) disposed in diametrically opposite positions and extending forward for mounting two barrier sections of the lens barrier device 7 (which will be described in detail later) thereon so as to allow the lens barrier device 7 to open and close following rotation of the barrier drive ring 6. An ornamental decorative annular ring 44 having an aperture similar in diameter to the first lens group G1 is attached to the inner movable cylinder 4 at the front end.

The intermediate cylinder 3 holds the second lens holding frame 33 fixedly mounting the second lens group G2 therein so as to allow the second lens holding frame 33 to move along the optical axis Z1 for zooming when moving between the protruded position and the extended position. Axial movement of the second lens holding frame 33 is caused by means of a mechanism comprising a cam and cam follower (not shown but known in various forms in the art) and is guided by the guide shaft 25B extending from the mounting ring 21. On the image side of the second lens group G2, there is the third lens holding frame 33 fixedly mounting the third lens group G3 supported for slide movement by the guide shafts 25A and 25B and movable along the optical axis Z1 for focusing by a focusing motor (not shown). An ornamental annular ring 34 is attached to the intermediate 3 at the front end.

Figure 4A:
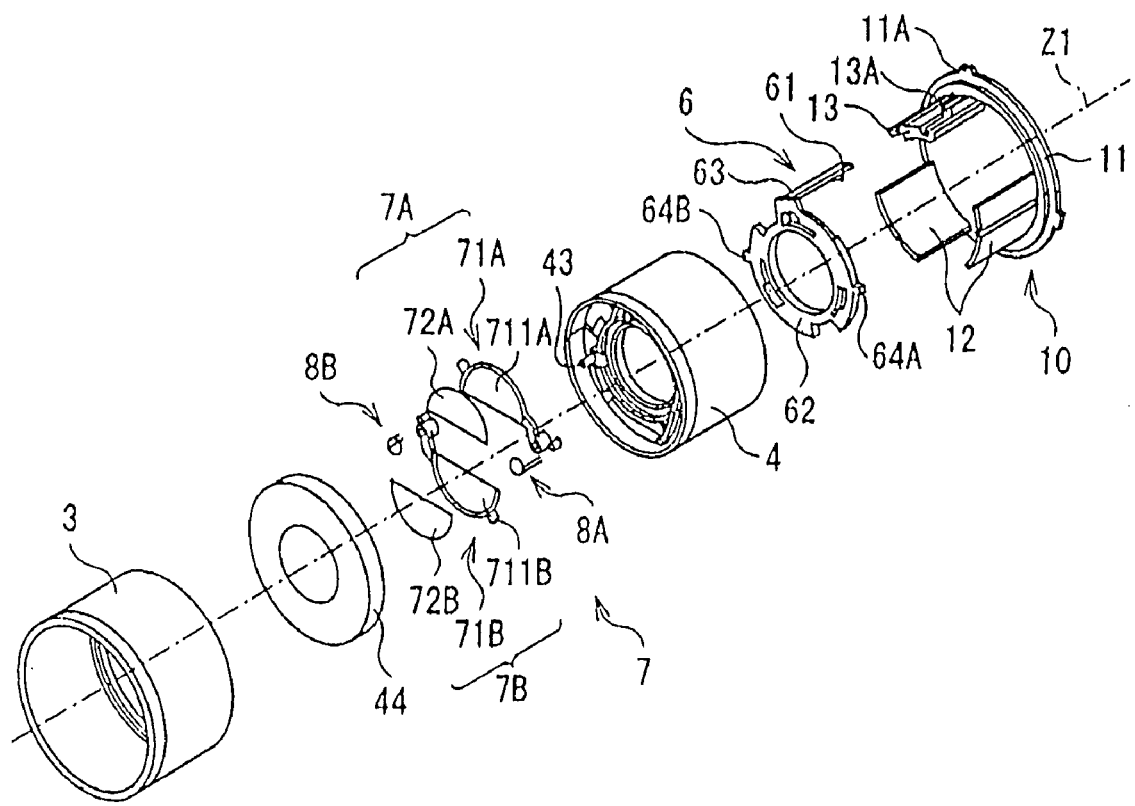
FIG. 4A is an exploded perspective view of an essential internal structure of the collapsible lens barrel.
Figure 4B:
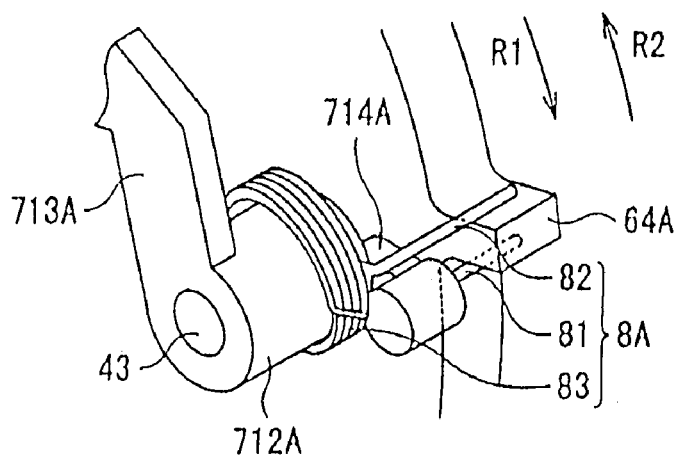
FIG. 4B is an enlarged view of an upper essential part of a lens barrier mechanism of the collapsible lens barrel.
Figure 4C:
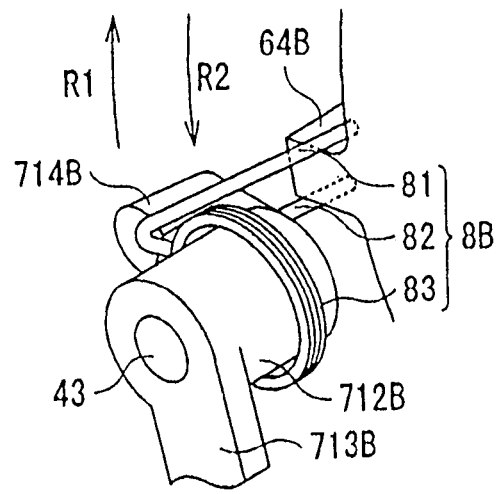
FIG. 4C is an enlarged view of a lower essential part of the lens barrier means of the collapsible lens barrel.

Referring to FIGS. 4A to 4C showing the lens protection mechanism including the lens barrier device 7 in detail, the lens barrier device 7 is disposed in front of the optical lens system comprising the first to third lens groups G1–G3. The lens barrier device 7 is divided into two, or upper and lower, barrier means 7A and 7B. More specifically, the lens barrier device 7 comprises a disk-shaped barrier blade made up two mating barrier blade halves 71A and 71B and a diskform ornamental blade made up two mating blade halves 72A and 72B. Because these barrier blade halves 71A and 71B and blade halves 72A and 72B are identical, respectively, they are denoted by reference numerals 71 and 72 in FIGS. 1 to 3. The barrier blade half 71A, formed as one integral piece, comprises a semicircular blade 711A having a peripheral projection 715A (see FIGS. 6 to 9) and a bushing 712A connected to the semicircular blade 711A by a connecting arm 713A. The bushing 712A has a rear projection 714A extending along the optical axis Z1 therefrom and corresponding in position to a radial projection 64A (which will be describe later) of the barrier drive ring 6 of the lens barrier device 7. The barrier blade half 71A thus structured is pivotally mounted on the pivotal shaft 43 of the inner cylinder 4 and is biased by bias spring means 8A. The ornamental blade half 72A is affixed to the semicircular blade 711A. Similarly, the barrier blade half 71B, formed as one integral piece, comprises a semicircular blade 711B having a peripheral projection 715B (see FIGS. 6 to 9) and a bushing 712B connected to the semicircular blade 711B by a connecting arm 713B. The bushing 712B has a rear projection 714B extending along the optical axis Z1 therefrom and corresponding in position to a radial projection 64B (which will be described later) of the barrier drive ring 6 of the lens barrier device 7. The barrier blade half 71B thus structured is pivotally mounted on the pivotal shaft 43 of the inner cylinder 4 and is biased by a bias spring 8B. The ornamental blade half 72B is affixed to the semicircular blade 711B. In this instance, it is desirable to make the blade half 72A, 72B forming the diskform ornamental blade of a stainless steel plate for the purpose of reinforcing mechanical strength of the barrier blade half 71A, 71B. The lens barrier device 7 is mounted in the inner cylinder 4 so that the barrier blade halves 71A and 72A rotate in opposite directions in a plane perpendicular to the optical axis Z1.

The barrier drive ring 6 is mounted in the inner cylinder 4 so as to rotate relatively to the inner cylinder 4 and, however, to be immobile along the optical axis Z1 with respect to the inner cylinder 4. The barrier drive ring 6, which is desirably formed as one integral piece, comprises a ring 62, a cam follower arm 63 extending rearward along the optical axis Z1 from the periphery of the ring 62 and having a cam follower 61 extending radially inward from the cam follower arm 63, and the radial projections 64A and 64B extending outward from the periphery of the ring 62 and disposed in diametrically opposite positions. The cam follower 61 is received for slide movement in the cam groove 13A of the axial flap 13 of the ring-shaped key device 10.

Figure 5:
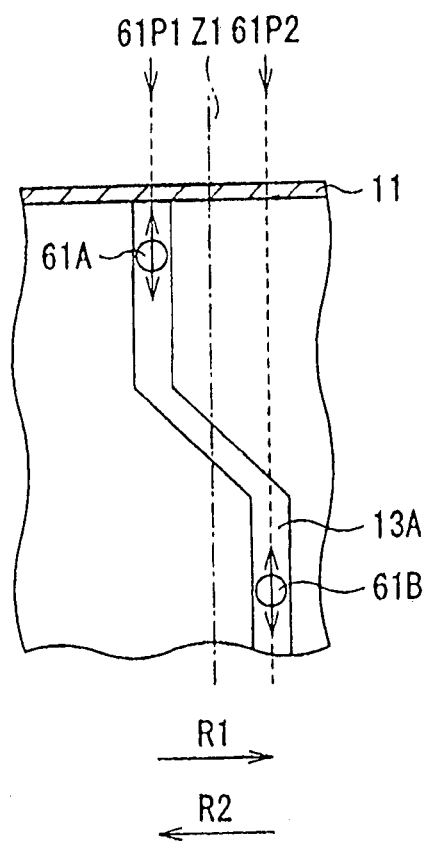
FIG. 5 is an illustrative view for explaining relative operation between a barrier driving ring and a key ring of the lens barrier mechanism.

As shown in FIG. 5, the cam groove 13A comprises two straight cam sections extending along the optical axis Z1 and separated in the circumferential direction and a straight bridge section by which the two straight cam sections are bridged. These ring-shaped key device 10 and barrier drive ring 6 are operationally connected through slide engagement between the cam groove 13A and the cam follower 61 so as to be movable along the optical axis Z1 relative to each other. For example, relative axial movement between the ring-shaped key device 10 and the barrier drive ring 6 causes the cam follower 61 to move in the cam groove 13A from one circumferential end position 61P1 (the cam follower denoted by 61A) to the other circumferential end position 61P2 (the cam follower denoted by 61B) or vise versa, thereby rotating the barrier drive ring 6 in an opening or normal circumferential direction R1 or a closing or reverse circumferential direction R2 between circumferential positions 61P1 and 61P2. As seen in FIGS. 4B and 4C, the bias means 8A comprises a coil spring 83 that is mounted on the bushing 712A of the semicircular blade 711A. The coil spring 83 has end extension 81 and 82 extending rearward along the optical axis Z1 and being separated in the circumferential direction so as to straddle the radial projection 64A of the barrier drive ring 6 and the rear projection 714A of the bushing 712A. These extensions 81 and 82 are such that the coil spring 83 is contracted when the extensions 81 and 82 are drawn away from each other. Further, the coil spring 83 has an inner diameter slightly larger than an outer diameter of the bushing 712A so as to provide a predetermined clearance between them while the coil spring 83 remains unloaded and, on the other hand, to be contracted and wound more tightly around the bushing 712A when the extensions 81 and 82 are drawn away with an external load grater than a critical load for resilient deformation of the coil spring 83. When the barrier drive ring 6 rotates in the normal circumferential direction R1, the radial projection 64A of the barrier drive ring 6 pushes the end extension 81 of the coil spring 83. At this time, a load that the barrier drive ring 6 applies to the end extension 81 is less than the critical load, so that the coil spring 83 remains its substantially original configuration and, in consequence, the end extension 82 pushes the rear projection 714A of the bushing 712A to rotate the semicircular blade 711A around the pivotal shaft 43 in the normal circumferential direction R1.

Figure 6:
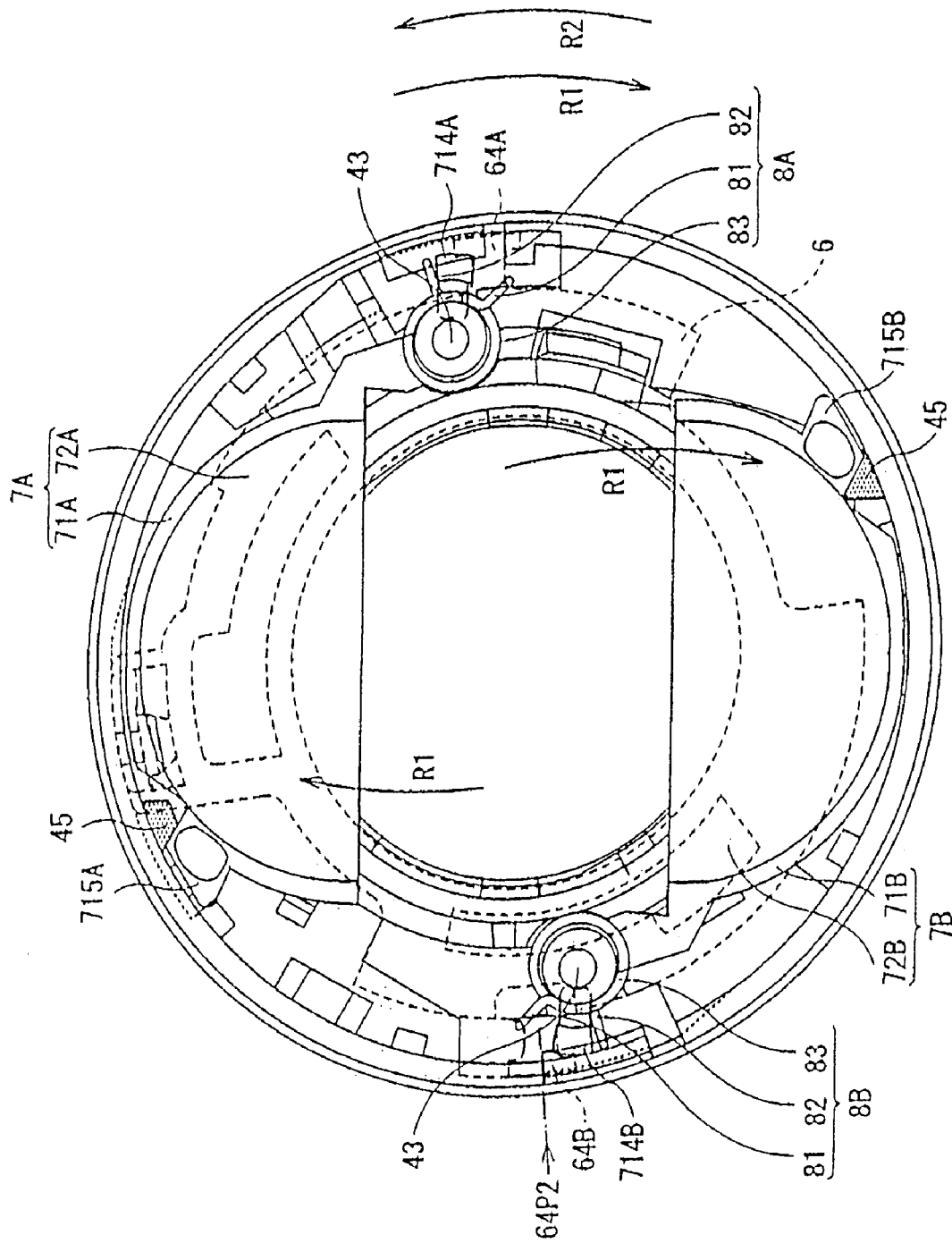
FIG. 6 is a front view of the collapsible lens barrel in which the lens barrier mechanism is in its open position.

Similarly, the bias means 8B comprises a coil spring 83 that is mounted on the bushing 712B of the semicircular blade 711B. The coil spring 83 has end extension 81 and 82 extending rearward along the optical axis Z1 so as to straddle the radial projection 64B of the barrier drive ring 6 and the rear projection 714B of the bushing 712B in the circumferential direction. Further, the coil spring 83 has an inner diameter slightly larger than an outer diameter of the bushing 712B so as to provide a slight clearance between them while the coil spring 83 remains unloaded and, on the other hand, to be contracted and wound more tightly around the bushing 712B when the barrier drive ring 6 rotates. When the barrier drive ring 6 rotates in the normal circumferential direction R1, the radial projection 64A, 64B of the barrier drive ring 6 pushes the end extension 81 of the coil spring 83. At this time, a load that the barrier drive ring 6 applies to the end extension 81 is less than the critical load, so that the coil spring 83 remains its substantially original configuration and, in consequence, the end extension 82 pushes the rear projection, 714A, 714B of the bushing 712A, 712B to rotate the semicircular blade 711A, 711B around the pivotal shaft 43 in the normal circumferential direction R1. The semicircular blade 711A, 711B can rotate in the normal circumferential direction R1 until its peripheral projection 715A, 715B hits a stoppers 45 extending radially inwardly from the inner cylinder 4 as shown in FIG. 6. Thereafter, if the barrier drive ring 6 is forced to make a further rotate, an external load greater than the critical load is applied to the end extension 81 of the coil spring 83 to draw the end extension 81 away from the end extension 82, so that the coil spring 83 is contracted and wound more tightly around the bushing 712A, 712B as long as there is a clearance left between the coil spring 83 and the bushing 712A, 712B.

Figure 8:
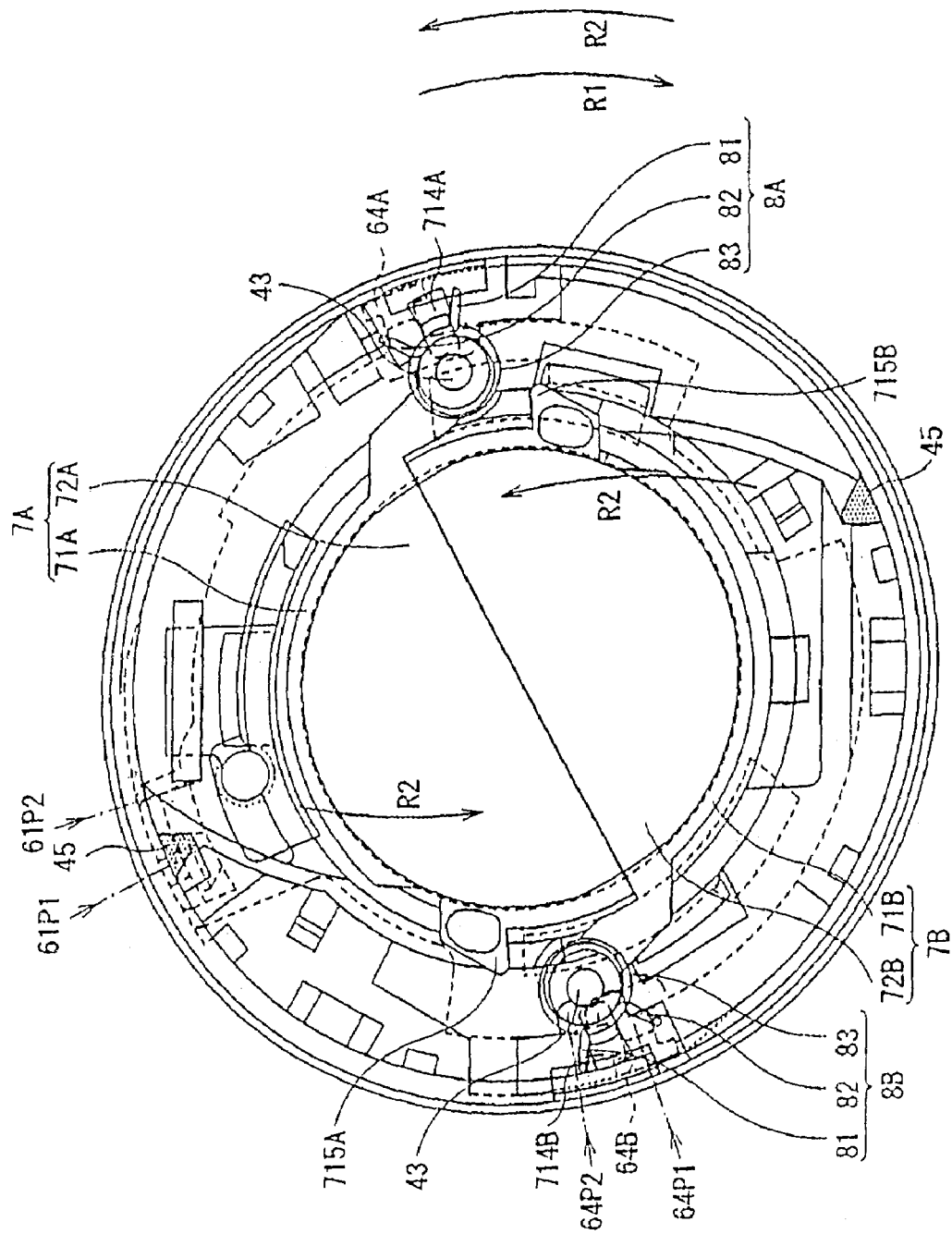
FIG. 8 is a front view of the collapsible lens barrel in which the lens barrier mechanism is in its closed position.

Conversely, when the barrier drive ring 6 rotates in the reverse circumferential direction R2, the radial projection 64A, 64B of the barrier drive ring 6 pushes the end extension 82 of the coil spring 83. At this time, a load that the barrier drive ring 6 applies to the end extension 82 is less than the critical load, so that the coil spring 83 remains its substantially original configuration and, in consequence, the end extension 81 pushes the rear projection 714A, 714B of the bushing 712A, 712B to rotate the semicircular blade 711A, 711B around the pivotal shaft 43 in the reverse circumferential direction R2. The semicircular blade 711A, 711B rotates in the reverse circumferential direction R2 until the upper and lower semicircular blades 711A and 711B are brought into close abutment as shown in FIG. 8. Thereafter, if the barrier drive ring 6 is forced to make a further rotation, an external load grater than the critical load is applied to the end extension 82 of the coil spring 83 to draw the end extension 82 away from the end extension 81, so that the coil spring 83 is contracted and wound tightly around the bushing 712A, 712B as long as there is a clearance left between the coil spring 83 and the bushing 712A, 712B. In this instance, the coil spring may not always have such a clearance.

As apparent from the above description, while the coil spring 83 remains its original configuration under an external load applied to the end extension 81 or 82, the coil spring 83 maintains the relative position between the barrier drive ring 6 of the lens barrier device 7 and the barrier means 7A, 7B. Accordingly, from that perspective, the coil spring 83 is defined as means for positionally neutralizing the barrier means 7A, 7B with respect to the barrier drive ring 6.

In operation of the collapsible lens barrel between the extended position and the reacted position, when turning on a power switch of the camera to activate the drive motor for extending the collapsible lens barrel, the operating cylinder 5 is rotated about the optical axis Z1 in the normal direction. During a continuous rotation of the lens operating cylinder 5, the intermediate cylinder 3 is forcibly rotated in the normal direction through slide engagement between the axial guide groove 51 of the lens operating cylinder 5 and the guide pin 31P of the cam follower 31 of the intermediate cylinder 3 and is simultaneously moved straight forward according to the configuration of the cam slot 23 through the slide engagement of the cam follower 31 with the cam slot 23 of the stationary outer cylinder 2 resulting from the rotation thereof. At the same time, during the continuous rotation of the lens operating cylinder 5, the ring-shaped key device 10 that is coupled to the stationary outer cylinder 2 through slide engagement between the axial guide groove 24 of the stationary outer cylinder 2 and the radial projection 11A extending from the key ring 11 of the ring-shaped key device 10 and is rotatable relatively to the intermediate cylinder 3 is move straight forward without rotating regardless of the rotation of the intermediate cylinder 3. The forward movement of the intermediate cylinder 3 resulting from the rotation in the normal direction thereof causes the inner cylinder 4 to extend forward through slide engagement between the helical cam groove 32 of the intermediate cylinder 3 and the radial cam follower 41 of the inner cylinder 4. In this instance, sine the ring-shaped key device 10 that is prevented from rotating is in engagement with the rear end of the inner cylinder 4 at the front ends of the axial flaps 12, the inner cylinder 4 is allowed to move straight along the optical axis Z1 without rotating about the optical axis Z1. By this means, extension of the collapsible lens barrel is completed.

After making a photograph, when the drive motor is activated to rotate in a reverse direction so as thereby to rotate the operating cylinder 5 in a reverse direction. The reverse rotation of the operating cylinder 5 causes the intermediate cylinder 3 to rotate about the optical axis Z1 in the reverse direction. The intermediate cylinder 3 is moved straight rearward along the optical axis Z1 according to the configuration of the cam slot 23 resulting from a continuous rotation of the operating cylinder 5 in the reverse direction. As a result the ring-shaped key device 10 is moved straight rearward along the optical axis Z1 without being rotated. The continuous rotation in the reverse direction and rearward movement of the intermediate cylinder 3 causes the inner cylinder 4 to move straight rearward along the optical axis Z1 through slide engagement between the radial cam follower 41 of the inner cylinder 4 and the helical cam groove 32 of the intermediate cylinder 3. During the rearward movement, the inner cylinder 4 is prevented from rotating. When the intermediate cylinder 3 and the inner movable cylinder 4 reach the refracted position shown in FIG. 2, the drive motor is deactivated. By this means, retraction of the collapsible lens barrel is completed.

Figure 7:
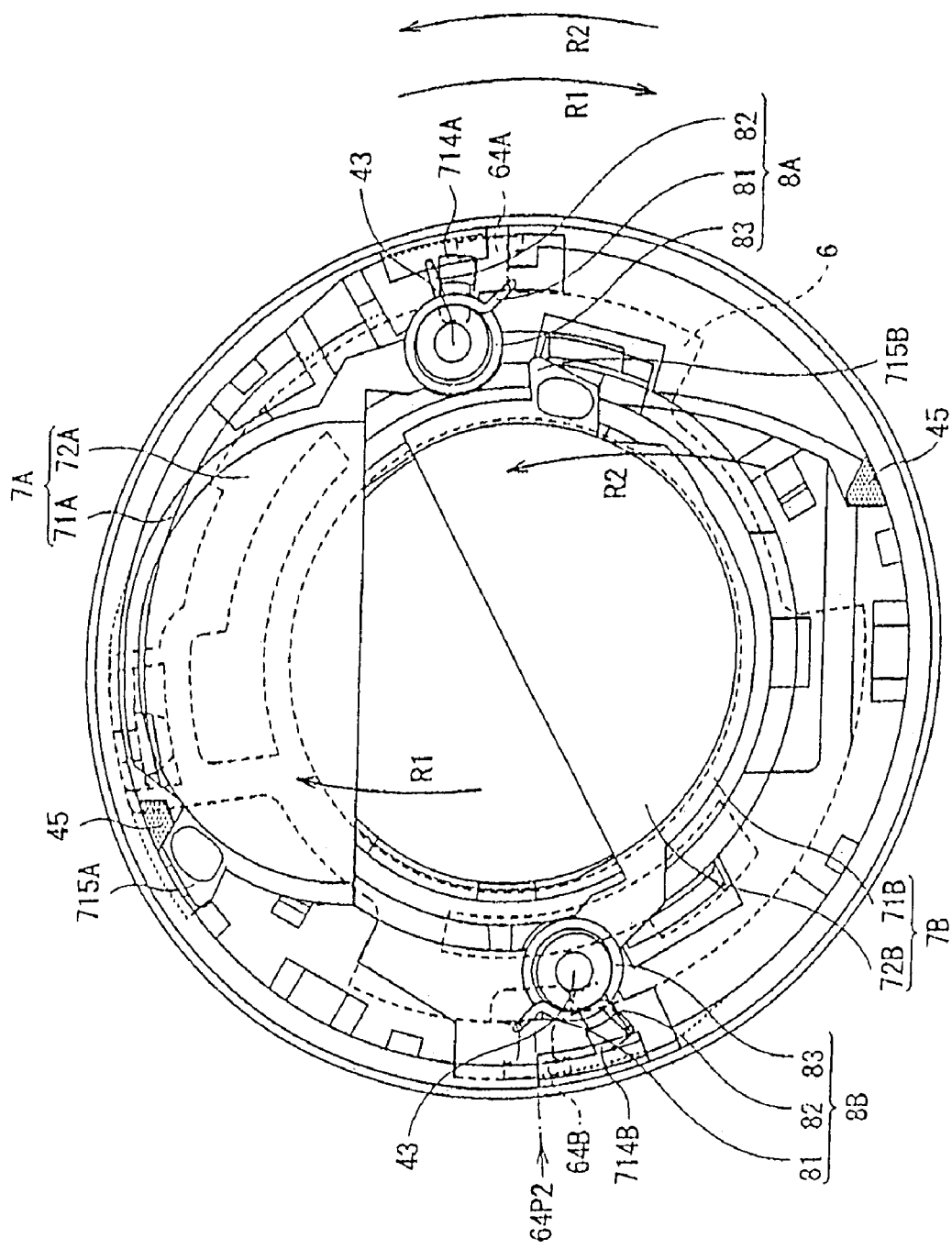
FIG. 7 is a front view of the collapsible lens barrel in which the lens barrier mechanism is in a wrong open position.
Figure 9:
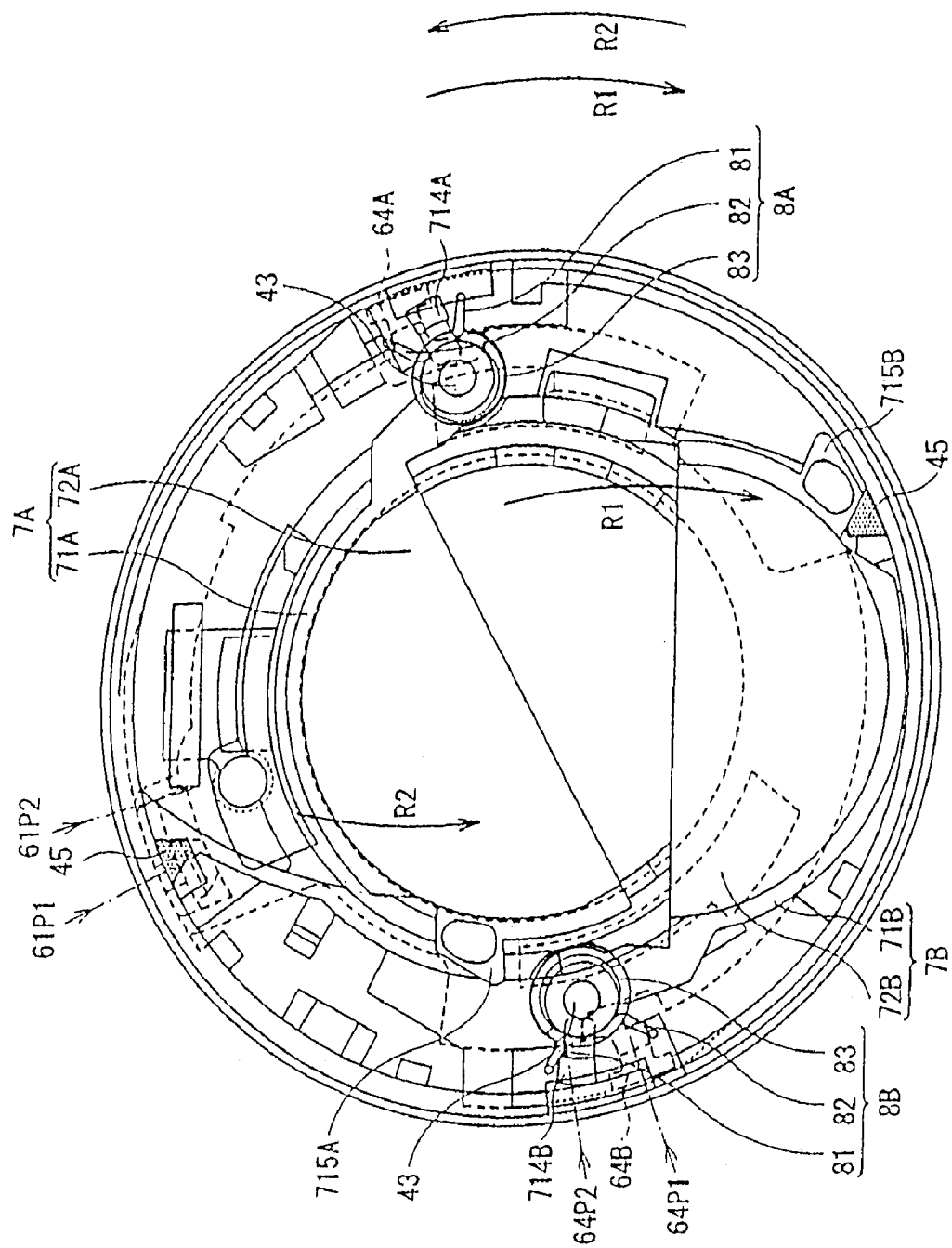
FIG. 9 is a front view of the collapsible lens barrel in which the lens barrier mechanism is in a wrong closed position.

Operation of the lens barrier device 7 will be hereafter described with reference to FIGS. 6 to 9 in conjunction with FIGS. 4A to 4C. FIG. 6 shows the lens barrier device 7 in the open position where both upper and lower barrier means 7A and 7B are properly opened so as to fully expose or uncover the optical lens system. FIG. 7 shows the lens barrier device 7 is in an improper open position where the lower barrier means 7B is improperly opened. The term "open position" as used herein shall mean and refer to a position where both upper and lower barrier means 7A and 7B have made their ways throughout to extremities of structurally allowed movement, in other words, provide a maximum opening, and the term "improper open position" as used herein shall mean and refer to a position where either one or both of the upper and lower barrier means 7A and 7B are on their ways to the extremities of structurally allowed movement. On the other hand, FIG. 8 shows the lens barrier device 7 in the closed position where the upper and lower barrier means 7A and 7B are properly closed so as to completely cover the optical lens system. FIG. 9 shows the lens barrier device 7 is in an improper closed position where the lower barrier means 7B is improperly closed. The term "proper closed position" as used herein shall mean and refer to a position where both upper and lower barrier means 7A and 7B completely cover the optical lens system, and the term "improper closed position" as used herein shall mean and refer to a position where either one or both of the upper and lower barrier means 7A and 7B are on their ways to the closed position.

The lens barrier device 7 is automatically opened resulting from extension of the collapsible lens barrel. When the lens barrel is operated to occupy the extended position shown in FIG. 1 from the retracted position shown in FIG. 2, that is, when the intermediate cylinder 3 rotates in the normal direction and moves straight forward resulting from a continuous rotation in the normal direction of the operating cylinder 5, the ring-shaped key device 10 is moved straight forward without rotating as was previously described. As a result, the barrier drive ring 6 of the lens barrier device 7 is rotated in the normal circumferential direction R1 through slide engagement between the cam follower 61 of the barrier drive ring 6 and the cam groove 13A of the axial flap 13 of the ring-shaped key device 10. More specifically, forward axial movement of the ring-shaped key device 10 forces the cam follower 61 of the barrier drive ring 6 to move in the cam groove 13A of the axial flap 13 of the ring-shaped key device 10 from the circumferential position 61P1 (the cam follower denoted by 61A) to the circumferential position 61P2 (the cam follower denoted by 61B) so as thereby to rotate the barrier drive ring 6 in the normal circumferential direction R1 with respect to the inner cylinder 4 and the ring-shaped key device 10 as shown in FIG. 5. Due to the rotation in the normal circumferential direction R1 of the barrier drive ring 6, the radial projections 64A and 64B push the end extensions 81 of the coil springs 8A and 8B, respectively, in the normal circumferential direction R1. During the rotation of the barrier drive ring 6 in the normal circumferential direction, the coil springs 83A and 83B maintain their original configuration and in consequence, they keep the barrier drive ring 6 and the barrier means 7A and 7B maintaining positionally neutralized, so that the upper and lower barrier means 7A and 7B are rotated in the normal circumferential direction R1 until the peripheral projections 715A and 715B of the semicircular blades 711A and 711B, respectively, hit against the stoppers 45 extending radially inwardly from the inner cylinder 4, respectively, as shown in FIG. 6. As a result, the barrier blade halves 71A and 71B stay in the open position. At this time, although the barrier drive ring 6 tends to further rotate slightly more in the normal circumferential direction R1, the coil springs 83 are contracted to absorb an external load applied to their end extensions 81 as restoring force. As a result, the coil springs 83 prevent the barrier drive ring 6, and hence the ring-shaped key device 10, from receiving impact through the barrier blade halves 71A and 71B upon the hit of the peripheral projections 715A and 715B of the semicircular blades 711A and 711B against the stoppers 45 and build up the external load as restoring force therein. By means of this restoring force, the coil springs 82 keep the upper and lower barrier means 7A and 7B in the open position while the collapsible lens barrel remains extended.

In the event where either one or both of the upper and lower barrier means 7A and 7B in the open position, for example the lower barrier means 7B as shown in FIG. 7, is unintentionally forced to rotate in the reverse circumferential direction R2 with an accidental external load stronger than the critical load, although the barrier drive ring 6, in particular the radial projection 64B, keeps staying in the open position 64P2, the rear projection 714B of the bushing 712B of the barrier blade half 71B moves in the reverse circumferential direction R2 toward the close position to push and draw the end extension 82 further away from the end extension 81 so that the coil spring 83 is contracted and wound further tightly around the bushing 712A. At this time, the coil spring 83 builds up the accidental external load applied to the lower barrier means 7B additionally as restoring force.

When the accidental external force is relieved from the lower barrier means 7B, the coil spring 83 forces the lower barrier means 7B in the normal circumferential direction R1 quickly with the restoring force so as thereby to bring the lower barrier means 7B back to the open position shown in FIG. 6.

The lens barrier device 7 is automatically closed resulting from retraction of the collapsible lens barrel. As was previously described, during retraction of the collapsible lens barrel, the inner cylinder 4 and the ring-shaped key device 10 move straight rearward along the optical axis Z1 without rotating. During the straight movement the inner cylinder 4 axially moves rearward relative to the ring-shaped key device 10. As shown in FIG. 5, the relative axial movement between the ring-shaped key device 10 and the inner cylinder 4 causes the cam follower 61 to move in the cam groove 13A from the circumferential position 61P2 (the cam follower denoted by 61B) to the circumferential position 61P1 (the cam follower denoted by 61A), thereby rotating the barrier drive ring 6 in the reverse circumferential direction R2 with respect to the inner cylinder 4 and the ring-shaped key device 10. In consequence, as shown in FIG. 8, the radial projections 64A and 64B push the end extensions 82 of the coil springs 8A and 8B, respectively, in the reverse circumferential direction R2. Then, the coil springs 83 expand with its own restoring force so as thereby to allow the end extension 81 to get close to the end expansion 82 until the end extensions 83 straddle the radial projections 64A and 64B of the barrier drive ring 6 and the rear projections 714A and 714B of the bushings 712A and 712B of the upper and lower barrier means 7A and 7B, respectively. That is, at this time, the coil springs 83 are restored to their original configuration with the consequence that the upper and lower barrier means 7A and 7B are positionally neutralized with respect to the barrier drive ring 6.

In succession to this, a further rotation of the barrier drive ring 6 forces the upper and lower barrier means 7A and 7B to rotate about the pivotal shafts 44, respectively, in the reverse circumferential direction R2 through the coil springs 83 positionally neutralizing the upper and lower barrier means 7A and 7B with respect to the barrier drive ring 6. On the way to completion of retraction of the collapsible lens barrier, the upper and lower semicircular blades 711A and 711B are brought into close abutment as shown in FIG. 8. Although the barrier drive ring 6 further rotates in the reverse circumferential direction R2 until before completion of retraction of the collapsible lens barrier, the coil springs 83 are contracted to absorb an external load applied to their end extensions 81 as restoring force. As a result, the coil springs 83 prevent the barrier drive ring 6, and hence the ring-shaped key device 10, from receiving impact due to abutment between the barrier blade halves 71A and 71B while keeping the upper and lower barrier means 7A and 7B in the closed position.

In the event where either one or both of the upper and lower barrier means 7A and 7B in the closed position, for example the lower barrier means 7B as shown in FIG. 9, is unintentionally forced to rotate in the normal circumferential direction R1 with an accidental external load stronger than the critical load, although the barrier drive ring 6, in particular the radial projection 64B, keeps staying in the open position 64P1, the rear projection 714B of the bushing 712B of the barrier blade half 71A moves in the normal circumferential direction R1 toward the open position to push and draw the end extension 81 further away from the end extension 82 so that the coil spring 83 is contracted and wound further tightly around the bushing 712A. At this time, the coil spring 83 builds up the accidental external load applied to the lower barrier means 7B additionally as restoring force.

When the accidental external force is relieved from the lower barrier means 7B, the coil spring 83 forces the lower barrier means 7B in the normal circumferential direction R1 quickly with the restoring force so as thereby to bring the lower barrier means 7B back to the closed position shown in FIG. 8.

As described in detail by way of preferred example, according to the configuration of the lens protection mechanism comprising the a lens barrier member disposed in front of the optical lens system in the optical lens barrel so as to rotate in a plane perpendicular to the optical axis, the neutralizing spring incorporated with the lens barrier member and the barrier drive ring operationally coupled to the lens barrier member by the neutralizing spring, the barrier drive ring is rotated to drive the lens barrier member through the neutralizing spring between the open position and the closed position. This configuration eliminates the need for providing springs separately for opening and closing the lens barrier member, the lens protection mechanism is structured by a reduced number of parts including the neutralizing spring in common with opening and closing the lens barrier member as compared with the conventional lens protection mechanisms. Therefore, there is no necessity to balance the springs provided separately for opening and closing the lens barrier member and, in addition, the neutralizing spring exercises less effect of manufacturing error on the lens protection mechanism.

Furthermore, when once the lens barrier member starts to open or to close, the lens barrier member is kept from receiving a counter load until reaching the normal open position or the normal closed position, the driving force required to open and close the lens barrier member is reduced. Therefore, it is not necessary to use a powerful spring, and hence a strong structure and parts for supporting the powerful spring. As a result, it is easy to satisfy a demand for reductions in manufacturing cost and compactness.

Although the lens protection mechanism of the present invention has been described as causing rotation of the barrier drive ring following extension and retraction of the collapsible lens barrel so as thereby to open and close the lens barrier member, it is possible to cause the barrier drive ring to rotate when a main power switch is operated. Further, the neutralizing sprig is not bounded to a coil spring and may take a form of U-shaped leaf spring.

Although the present invention has been described as applied to a digital camera equipped with a zoom lens by way of example, it can be realized in various conventional cameras equipped with or not equipped with zoom lenses and it will be appreciated that variants and other embodiments can be effected by person of ordinary skill in the art without departing from the scope of the invention.

What is claimed is:

1. A lens mechanism for protecting an optical lens system in an optical lens barrel, comprising:
   a lens barrier member disposed in front of the optical lens system in the optical lens barrel, said lens barrier member being capable of rotating in a plane perpendicular to an optical axis of the optical lens system between an open position in which said lens barrier member uncovers the optical lens system and a closed position in which said lens barrier member covers the optical lens system for protection;
   a neutralizing spring incorporated with said lens barrier member; and a barrier drive ring operationally coupled to said lens barrier member by said neutralizing spring, said barrier drive ring being rotatable in opposite directions about said optical axis of the optical lens system so as to drive said lens barrier member through said neutralizing spring between said open position and said closed position.

2. The lens protection mechanism as defined in claim 1, wherein said optical lens barrel is of a collapsible type collapsible along said optical axis of the optical lens system between an extended position and a retracted position and rotates said barrier drive ring in opposite directions during movement of said lens barrel between said extended position and said retracted position.

3. The lens protection mechanism as defined in claim 2, wherein said optical lens barrel comprises a movable cylinder movable along said optical axis of the optical lens system, a guide member for guiding axial movement of said movable cylinder between said extended position and said retracted position and a cam mechanism for operationally coupling said barrier drive ring to said guide member, said movable cylinder holding at least one lens component of the optical lens system and supporting said barrier drive ring and said lens barrier member for rotation, and said barrier drive ring being caused to rotate about said optical axis resulting from said axial movement relative to said guide member.

4. The lens protection mechanism as defined in claim 2, wherein said barrier drive ring has a radial projection extending from said ring, said lens barrier member has a projection corresponding in circumferential position to said radial projection, and said neutralizing spring comprises a coil spring having opposite end extensions which straddles said projections of said lens barrier member and said barrier drive ring therebetween so as to keep said lens barrier member in neutralized position with respect to said barrier drive ring between said open position and said closed position.

5. The lens protection mechanism as defined in claim 4, wherein said neutralizing spring allows said lens barrier member to rotate toward said open position from said closed position while said barrier drive ring stays in said closed position and to rotate toward said closed position from said open position while said barrier drive ring stays in said open position.

6. The lens protection mechanism as defined in claim 1, wherein said lens barrier member is divided into two parts disposed symmetrically about said optical axis of the optical lens system.

7. A camera having an optical lens barrel equipped with a lens protection mechanism as set forth in claim 1.

* * * * *